Patented Nov. 5, 1940

2,220,542

UNITED STATES PATENT OFFICE 2,220,542

TWO SPEED FORWARD AND TWO SPEED REVERSE TRANSMISSION

Carl D. Peterson, Toledo, Ohio

Application December 7, 1938, Serial No. 244,446

1 Claim. (Cl. 74—360)

This invention relates to change-speed transmission gearings, and particularly to heavy-duty transmission gearing, as for industrial purposes and has for its object a transmission gearing of this type having a plurality of reverse as well as forward speeds, and which is particularly compact in construction and in which the same gears on the drive shaft are used in both the forward and reverse speeds.

The invention consists in the novel features and in the combinations and constructions hereinafter set forth and claimed.

In describing this invention, reference is had to the accompanying drawings in which like characters designate corresponding parts in all the views.

This gearing includes a suitable casing, drive or input, driven or output, and reverse shafts mounted in parallelism in the casing, gearing between the driven and the reverse shafts, and gearing between the drive and the driven shafts and between the drive and reverse shafts including a plurality of gears on the drive shaft and common to the trains of gears between the drive shaft and the driven shaft and between the drive shaft and the reverse shaft, and clutches operable to selectively clutch gears on the driven and reverse shafts to said shafts, which gears mesh with gears on the drive shaft.

1, 2 and 3 designate, respectively, the drive or input, driven or output, and reverse shafts, these being mounted in parallelism with each other in suitable bearings in the end walls of a suitable casing 4. The casing is in the form of a box and one end wall 5 is removable and secured to the box in any suitable manner.

The drive shaft 1 extends through the front wall of the gear box or casing and is connected in any well known or suitable manner to a source of power or to the shaft of an engine. It is usually connected to the engine shaft through a normally engaged clutch which is disengaged by any throw-out means. The driven shaft 2 extends through the rear wall 5 of the casing. A pulley or other power take-off means is mounted on or connected to the outer end of the driven shaft.

Figure 1:
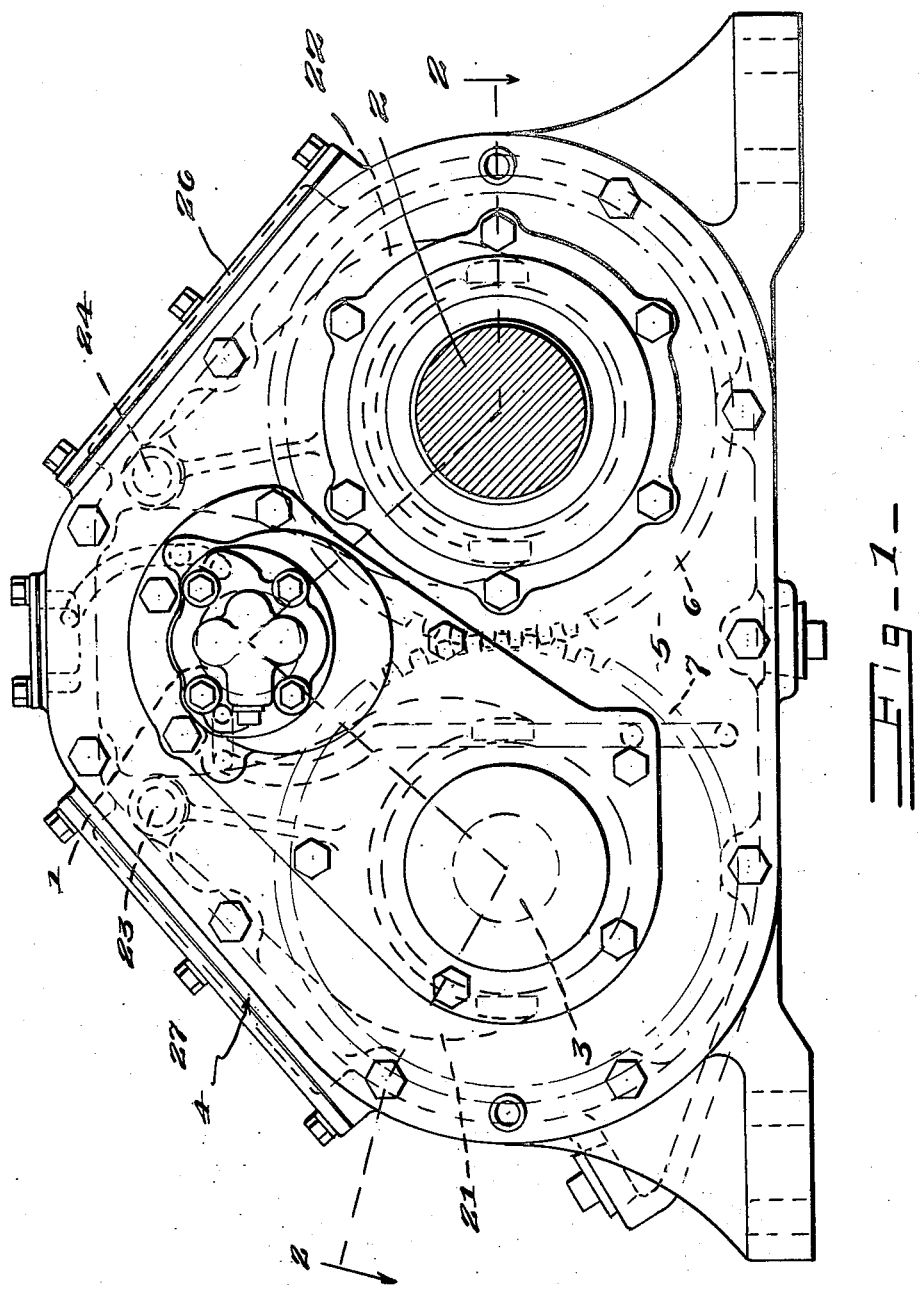
Figure 1 is an end elevation of a gearing embodying my invention.

The shafts 1, 2 and 3 are here shown with their axes arranged at the angles of a triangle formed by straight lines between said axes, and preferably the drive shaft 1 at the apex of the theoretical triangle, as seen in Figure 1.

6 and 7 designate respectively gears on the driven shaft 2 and reverse shaft 3, these meshing together beneath the drive shaft 1, as seen in Figure 1. 8 and 9 designate respectively gears on the drive shaft 1 and rotatable therewith and meshing respectively with gears 10 and 11 on the driven shaft 2 and with gears 12 and 13 on the reverse shaft 3, the gears 10, 11 and 12, 13 being mounted on the shafts 2 and 3 respectively to normally rotate about the same. The gears 8, 10 and 12 are the same size so that the ratio between the drive shaft 1 and the driven shaft 2 through the gears 8, 10 is one to one, and likewise the ratio between the drive shaft 1 and reverse shaft 3 through the gears 8, 12 is one to one. These one-to-one ratio gears are located near the end wall 5 in which the bearings for like ends of these shafts are mounted. The gears 6, 7 are located on said shafts 2, 3 near the other wall of the gear box.

The gears 9, 11 and 13 are of such size as to produced a ratio forward and reverse of two plus, to one. The gears 10, 11 are individually or alternately clutchable to the shaft 2 by means of a sliding collar 14 having internal splines interlock with splines on a collar 15 keyed to the shaft 2, the collar 14 being shiftable in one direction from neutral to engage its splines with clutch teeth 16 on the gear 10, and in the other direction with clutch teeth 17 on the gear 11. Likewise, the gears 12 and 13 are clutched selectively or alternately to the shaft 3 by means of a similar clutch collar 18 shiftable in one direction from neutral to cause its internal splines to interlock with clutch teeth 19 on the gear 12, and in the other direction to interlock with clutch teeth 20 on the gear 13.

The clutches are shifted by suitable shifting means or forks 21, 22 on shift rods 23, 24 in the casing, which shift rods are selected and shifted by any suitable selecting and shifting mechanism not shown. The casing 2 is generally triangular in form and inclined sidewise thereof and provided with suitable removable cover plates 26 and 27.

The input shaft of the transmission is connected to the crank shaft of an internal combustion engine, Diesel or gasoline, through the usual engine clutch operated by a throwout lever. The transmission is primarily intended for use in oil fields, and is mounted in juxtaposition to the engine, as on skids. The power is taken from the output shaft, as through a belt or sprocket chain pulley on the output shaft, and the shifting controlled by a selecting and shifting mechanism, usually located remote from the transmission.

Figure 2:
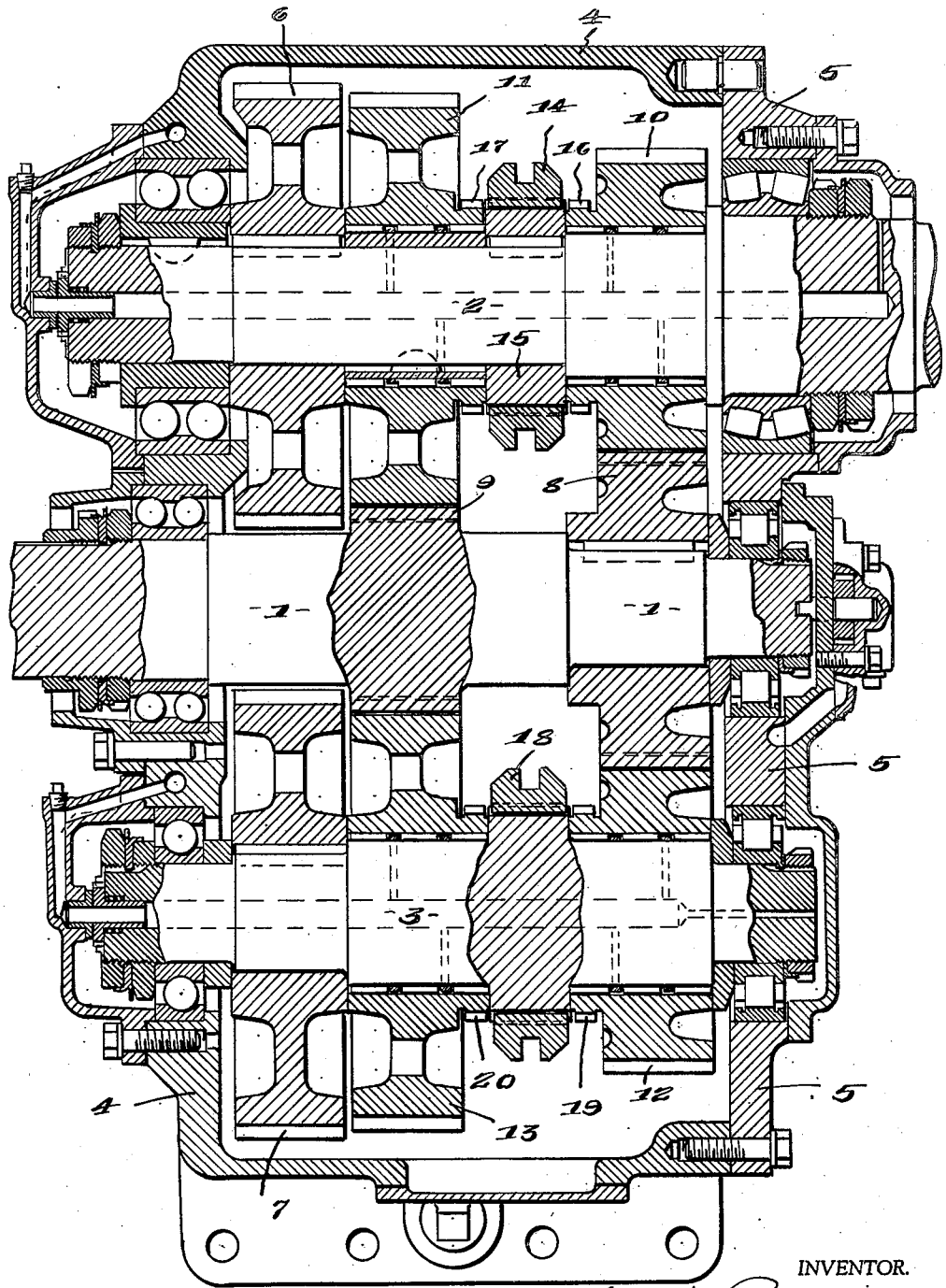
Figure 2 is a sectional view on line 2—2, Figure 1.

In operation, when the clutch collar 14 is selected and shifted to the left (Figure 2), the gear 11 is clutched to the driven shaft 2, and as it meshes with the gear 9 on the drive shaft, low speed forward is produced through the gears 9, 11 and shaft 2. Shifting of the clutch collar to the right (Figure 2) clutches the gear 10 to the driven shaft 2, so that high speed forward through the one-to-one ratio is effected through the gears 8, 10 and shaft 3. Shifting of the collar 18 to the left clutches the gear 13 to the reverse shaft 3, effecting low reverse speed from the drive shaft 1 through gears 9, 13, shaft 3, gears 7 and 6 and shaft 2. Shifting of the collar 18 to the right (Figure 2) clutches the gear 12 to the reverse shaft 3 to effect high reverse speed through a one-to-one ratio from shaft 1 through gears 8, 12, shaft 3, gears 7, 6 and driven shaft 2.

What I claim is:

In a change-speed transmission gearing, a suitable casing, driving and driven shafts and a reverse shaft mounted in parallelism in the casing, forward gear trains between the drive shaft and the driven shaft including gears fixed on the drive shaft and gears on the driven shaft meshing therewith, and normally rotatable about the same and clutchable thereto, reverse gear trains between the drive and driven shafts including the same gears on the drive shaft and gears on the reverse shaft meshing respectively with the gears on the drive shaft and normally rotatable about the reverse shaft and clutchable thereto, and clutches operable to individually clutch any one of said gears on the drive and reverse shafts thereto, the clutches being located between the gears on the driven and reverse shafts, and each being operable in opposite directions from neutral position to clutch one or the other of the gears on the driven or reverse shaft thereto.

CARL D. PETERSON.